No. 810,751. PATENTED JAN. 23, 1906.
F. O. HARTMAN.
ELECTRIC CIRCUIT BREAKER.
APPLICATION FILED APR. 6, 1903.
4 SHEETS—SHEET 3.
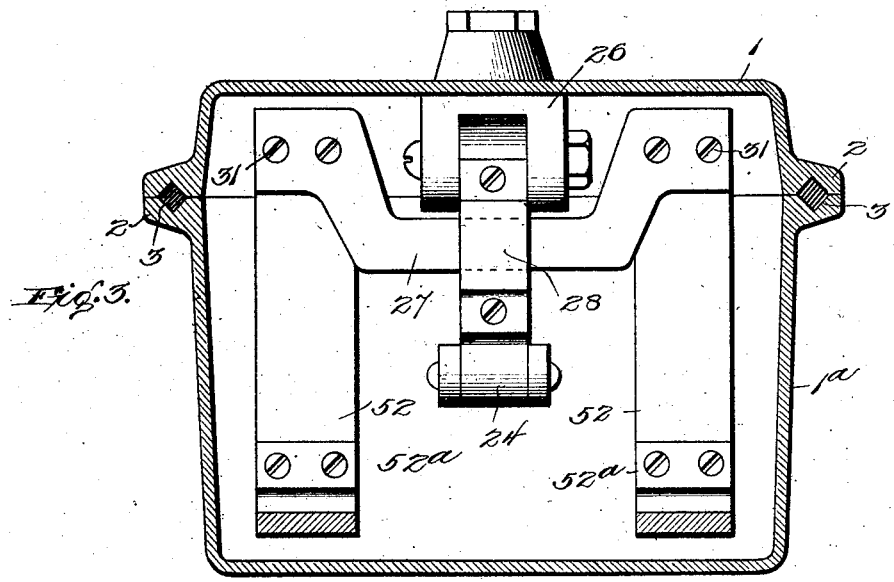
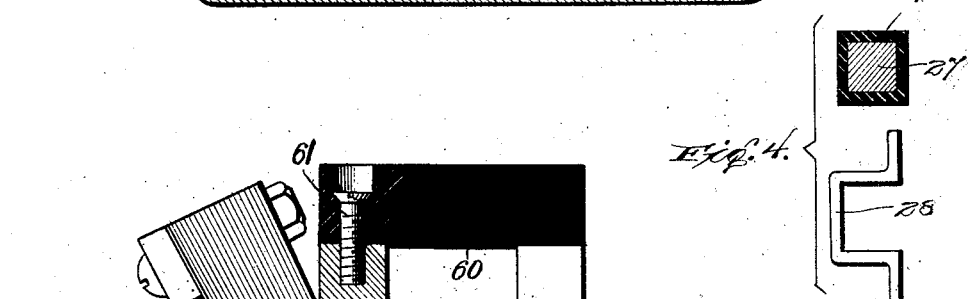
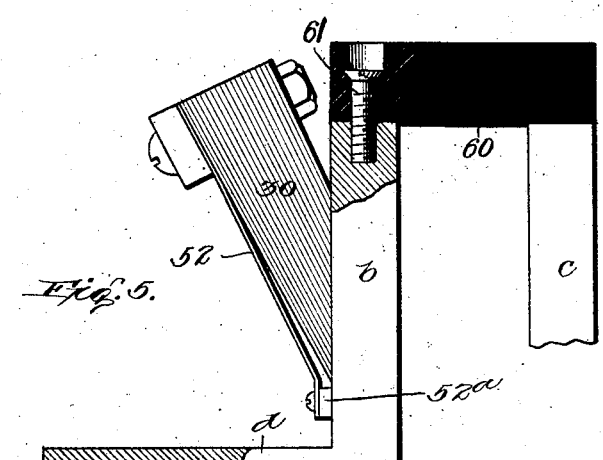
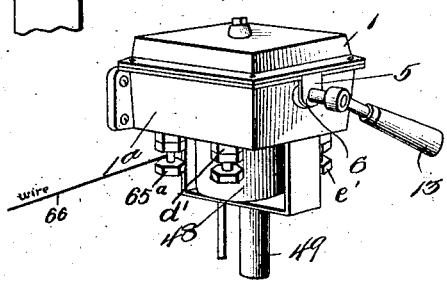
Witnesses
Inventor:
Frank O. Hartman
by John H. Cased
his Attorney No. 810,751. PATENTED JAN. 23, 1906.
F. O. HARTMAN.
ELECTRIC CIRCUIT BREAKER.
APPLICATION FILED APR. 6, 1903.
4 SHEETS—SHEET 4.
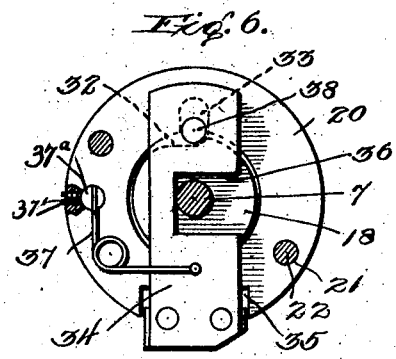
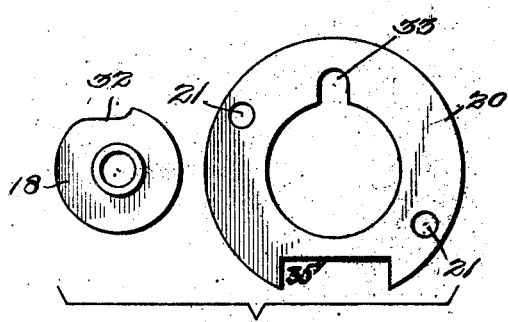
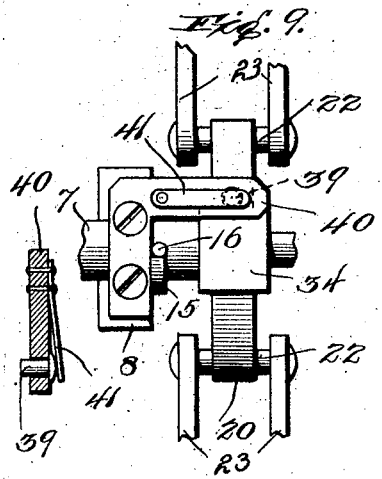
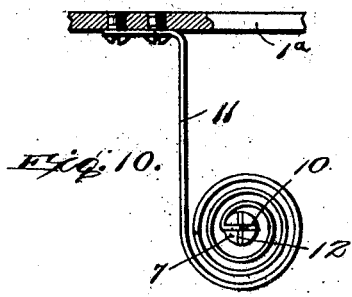
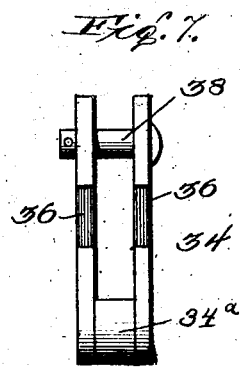
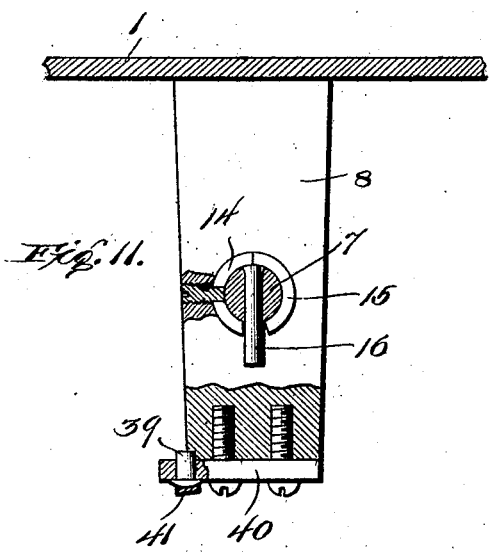
Witnesses
Inventor
Frank O. Hartman
John H. Caxx
by
Lix Attorney.

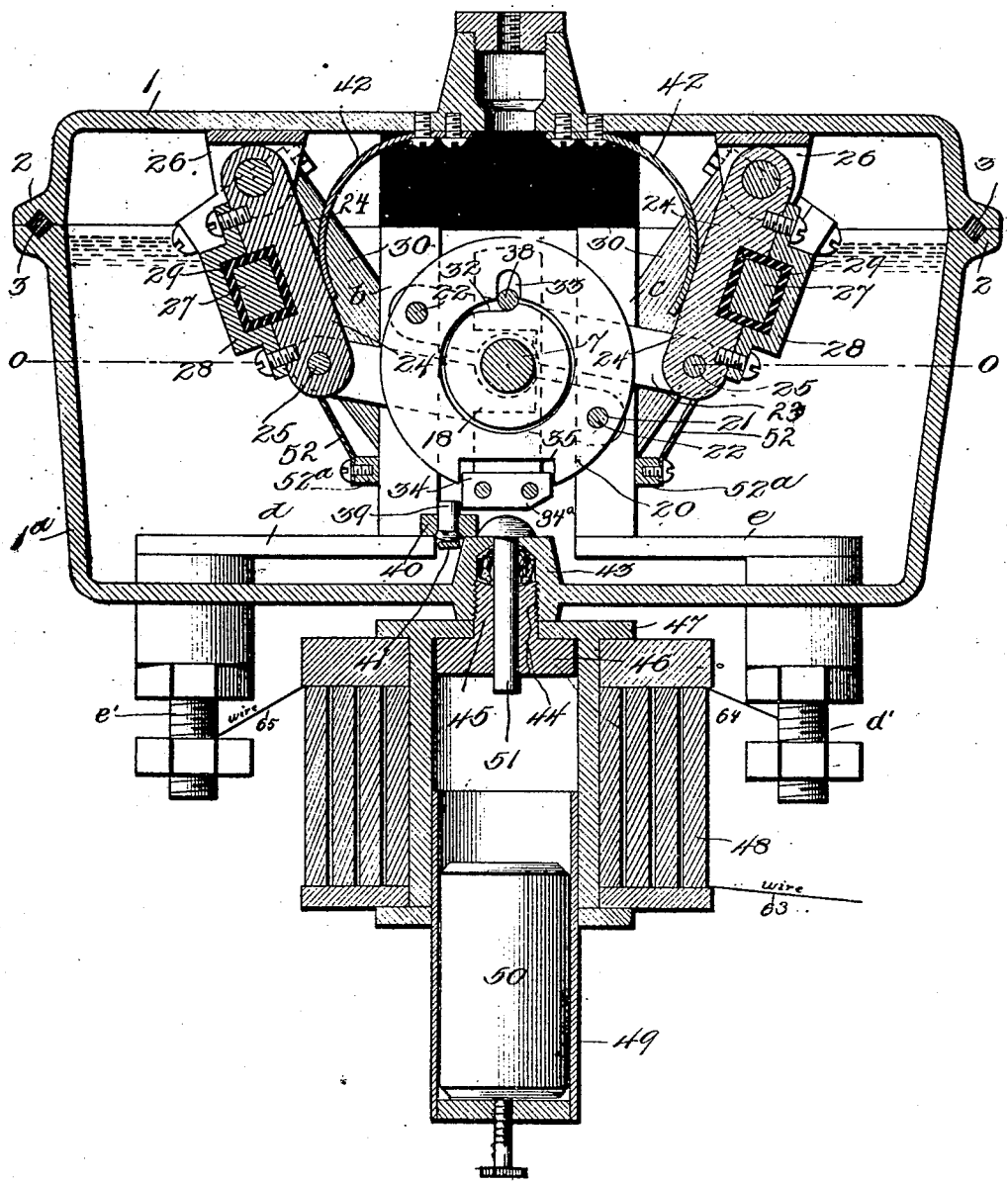

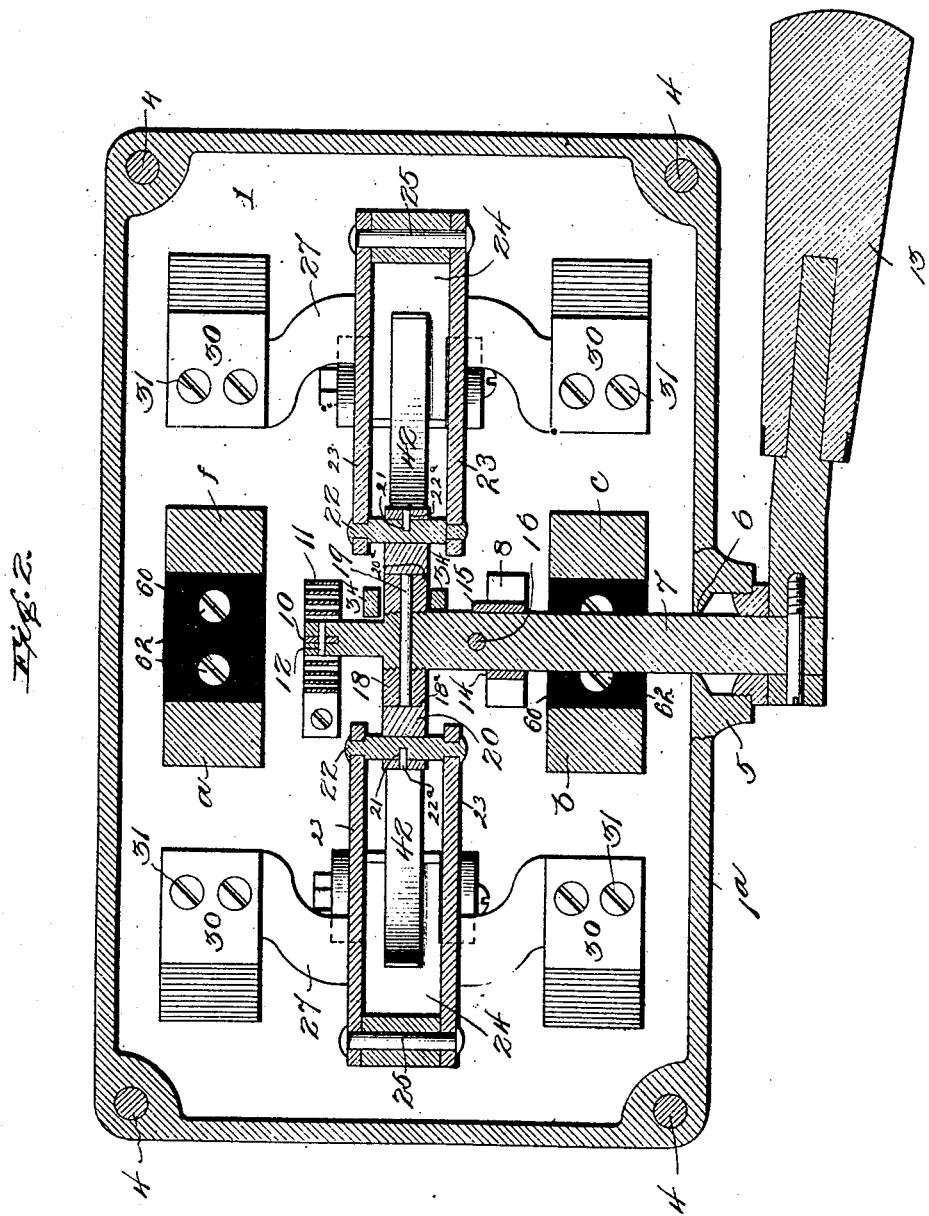

UNITED STATES PATENT OFFICE.

FRANK O. HARTMAN, OF MANSFIELD, OHIO.

ELECTRIC-CIRCUIT BREAKER.

No. 810,751.   Specification of Letters Patent.   Patented Jan. 23, 1906.

Application filed April 6, 1903. Serial No. 151,384.

*To all whom it may concern:*

Be it known that I, FRANK O. HARTMAN, a citizen of the United States of America, and a resident of Mansfield, Richland county, Ohio, have invented certain new and useful Improvements in Electric-Circuit Breakers, of which the following is a specification.

My invention relates to a double-pole circuit-breaker which can be used as a single, double, triple, or quadruple circuit-breaker, if desired.

The objects of my invention are, first, to provide an automatic means for regulating the current in an electric circuit, so as to break the circuit or cut off the flow of the current upon the occurrence of abnormal conditions in the circuit or when the current exceeds a predetermined amount; second, to provide a means in the same instrument for breaking the circuit by hand, thus dispensing with the necessity of using a separate hand-switch on the circuit.

A further object of my invention is to prevent the formation of an injurious arc which takes place at the moment the circuit is broken. This I have accomplished by the construction and arrangement of parts hereinafter described and pointed out.

In the carrying out of my invention I first provide laminated contact members adapted to engage the terminals and closed or forced into such engagement against a strong spring-pressure, so that when the contacts are released there will be no danger of their "freezing" or sticking to the terminals at critical periods. Secondly, by leading or completing the circuit through a number of make-and-break connections, which connections are simultaneously broken, I succeed in providing a number of breaks in series to facilitate the interruption of a heavy current. Third, I inclose the switch mechanism of the circuit-breaker in a case or box filled with oil or other insulating fluid, so that when the break takes place the gap formed between the movable and stationary contacts will be filled by the non-conducting fluid, thereby almost preventing the usual arcing, which takes place when the break is made.

A further object of my invention is to prevent the closing of the circuit during the continuance of an overload or short circuit and to insure the automatic and instantaneous opening of the switches when such conditions prevail irrespective of the fact that the operating-handle remains in the grasp of the operator. It frequently happens that in resetting a circuit-breaker after a "blow-out" has occurred the short circuit or overload still exists. Under such circumstances great damage may occur to the motor or apparatus which the circuit-breaker is designed to protect by reason of the fact that the handle controlling the switch being in the grasp of the operator the automatic opening of the switches is prevented because it does not work independently of the operating-rod. This difficulty has been obviated to some extent in circuit-breakers heretofore constructed by providing a double-pole circuit-breaker with two independent switches and each closed by means of separate arms or operating-handles. In constructing a switch as described, if one switch is closed while an excessive current is flowing, the electromagnetic device will respond the instant it is attempted to close the second switch, and that opens the first switch; but with such a circuit-breaker it is possible for an inexperienced or careless operator by closing both switches simultaneously, to bring about the conditions aforestated and cause great damage if not entirely destroying the apparatus or motor. In the construction of my device I have provided a means for closing both of the switches simultaneously with a single operating-bar and handle, and at the same time the arrangement is such that when it is attempted to reset or close the circuit-breaker while an overload condition exists on the circuit the moment the movable contacts engage the contact-block the switches will open automatically irrespective of the fact that the controlling-handle remains in the grasp of the operator.

My device is also intended to be used as a hand-switch, the circuit being closed by turning the handle in one direction and opened by turning the handle in the opposite direction. When it is attempted to close the circuit while abnormal conditions prevail, the switch will be automatically opened.

It will clearly appear that with a circuit-breaker constructed as described it will not be necessary to provide an additional switch on the circuit, and the space on the switchboard occupied by the usual hand-switch can be saved and the complication of the switches and connections avoided.

A further object of improvement is to provide a means of breaking or opening the circuit or closing it automatically or manually by the use of a plurality of switches which are operated and controlled through the medium of a single operating handle and bar.

Another object is to construct a circuit-breaker in such a manner as will permit of the operating mechanism being inclosed in a case filled with insulating fluid, whereby arcing is prevented to a large extent and undue friction and the corrosion of the parts is reduced to a minimum.

I attain these and other objects by the mechanism illustrated in the accompanying drawings, in which—

Figure 1 is a vertical cross-sectional side view of the circuit-breaker, taken through the center, showing the laminated contacts in contact with the contact-blocks, and a sectional view of the releasing mechanism and solenoid. Fig. 2 is a transverse cross-sectional view looking upward, showing the switch open and the means for connecting the swinging laminated contacts to the outer disk through the medium of suitable links. Fig. 3 is an end view showing the method of clamping the laminated contact-carrying arms to the swinging bar, which latter is journaled to a standard attached to the upper portion of the case. Fig. 4 shows a side view of the clamp and the method of insulating the swinging bar from the contact-carrying arms. Fig. 5 shows the method of connecting the circuit with the switch mechanism of the circuit-breaker, also the method of insulating the extension of the contact-block or connecting-piece from the case. Fig. 6 is a side view of the inner and outer disks and catch, showing the method of locking the inner and outer disks together and releasing them. Fig. 7 is an edge view of the catch. Fig. 8 shows a side view in detail of the inner and outer disks. Fig. 9 is a top view showing the locking-pin journaled in a suitable bracket in such a manner as to bring it in contact with the catch, whereby the laminated contacts are retained and locked in closed position. Fig. 10 is a side view of a leaf coil-spring which is secured to one end of the operating-rod. Fig. 11 is a side view of the standard, showing a sleeve carried thereby with a portion of its circumference projecting beyond the sides of the standard, by means of which the throw of the handle-rod is regulated through the medium of a pin which is attached to the handle-rod and adapted to contact with the shoulders of the projecting portion of the sleeve; also, is shown a side view of the bracket and locking-pin. Fig. 12 is a perspective view of the case as it appears inclosing the circuit-breaker mechanism.

Similar characters refer to similar parts throughout the several views.

The inclosing case is made of an upper and lower portion 1 and 1ª, with a flange 2 extending around both portions and projecting outwardly from the exterior of the case. A suitable groove 3 is formed in the abutting faces of the flanges into which packing is inserted for the purpose of securing a liquid-tight joint when the upper and lower portions of the case are connected together. This is accomplished by the use of ordinary bolts or screws 4. A depending ear 5 is made integral with the upper portion and is provided with an aperture 6, in which one end of the operating-rod 7 is journaled. The opposite end of the rod is supported and journaled in the standard 8. One end of the rod is turned smaller in diameter than the body portion and is provided with a slot 10 to receive one end of the coiled leaf-spring 11, which is retained in place by the pin 12, which passes through one end of the spring and rod. The other end of the spring is secured to the lower portion of the case by suitable clamps or screws.

When the operating-rod is rotated, it winds the spring around the end of the rod, thereby increasing its tension, and as the operating-handle 13, which is secured to the rod 7, is turned in one direction it rotates the rod and causes a catch-pin 38, carried by a catch 34, to releasably lock a disk 18, secured to the rod to an annulus 20. The annulus is connected to swinging contacts 30, and such rotation of the annulus operates to bring said contacts into engagement with terminals $a\ b\ c\ f$, a fastening-means being provided for engaging the annulus when the contacts and terminals engage to normally prevent a backward rotation thereof, all as will be more fully explained hereinafter.

Fig. 2 is a cross-sectional view looking upwardly, and that portion of the standard 8 shown in full lines are the flanges by which it is secured to the top plate, the remainder of the standard 14 15 being shown in cross-section.

It will be noted that when the switch is released automatically or otherwise the recoil of the spring upon being relieved of its tension will unwind and rotate or return the operating rod and handle to their normal position when the switch is open. As the switch mechanism is inclosed, the closed or open position of the switch cannot be determined from the exterior of the case except by the position of the operating-handle. It is important, therefore, that it be returned to the same position immediately upon the breaking of the circuit automatically or by hand, as it would be difficult to determine its open or closed position from the exterior of the casing. The arrangement of the spring, as described, accomplishes this object.

A sleeve 14 is mounted rigidly in the standard 8, the sleeve having a portion 15 of its circumference extending beyond the standard. A pin 16 is fitted to an aperture provided in the operating-rod 7, one end of the pin projecting beyond the circumference of the rod. This pin is adapted to contact with the projecting portion 15 of the sleeve, providing a stop and regulating the throw of the operating-handle when it is released. To the screw-threaded portion of the rod a disk 18, designated an "inner" disk, having a screw-threaded aperture in the center, is fitted and retained in place by the pin 19 passing through the rod and disk. An annular disk 20, designated "outer" disk, is fitted to the periphery of the inner disk and is adapted to partially rotate thereon. The outer disk 20 is provided with transversely-extending apertures 21 21, designed to receive the pins 22 22, which connect the ends of links 23 23, the opposite ends of the links being connected to the free or lower ends of the swinging bars 24 24 by means of the pins 25 25, the swinging bars being pivotally journaled upon the standards or ears 26 26, secured to and depending from the upper portion or cover of the case 1. The outer disk 20 is provided with a flange or shoulder 20$^a$, which is received in a groove 18$^a$, formed on the periphery of the inner disk 18, the purpose of which construction is to retain the outer disk in position on the inner disk and yet permit it to rotate thereon. The pins 22 22 are secured in the outer disk, preferably by means of the studs 22$^a$ 22$^a$, and are headed or upset at their outer ends, as shown in Fig. 2. The contact-carrying arms 27 are securely clamped to the swinging bars 24 by means of the clamps 28. The method of insulating the arms from the swinging bar is shown in Fig. 4, the insulation consisting of the rubber or other nonconducting sleeve represented by reference-figure 29 and the arms by reference-figure 27. The laminated contacts 30 are attached to the arms 27 by suitable screws or bolts 31.

It will be noted that the arrangement and connection of the parts as described connect the outer disk to the laminated contacts through the medium of the links, and when motion is imparted to the disk it operates to bring the contacts in closed or open position, completing or breaking the circuit, as the case may be.

A portion of the periphery of the inner disk is provided with an inclined or wedge-shaped tangentially-extending pinway 32, which is adapted to register with the pinway 33, formed transversely in the annular disk 20, when the circuit-breaker mechanism is locked in closed position. The pinway 33 is deep enough to entirely receive the pin 38, hereinafter referred to. A catch 34, (see Fig. 7,) having an open center portion, is fitted to the sides of the inner and outer disks, for the purpose of keeping the disks in alinement and preventing lateral motion. A notch 35 is formed in the periphery of the outer disk for the purpose of allowing the catch to be reciprocated upon the disks. Cut-away portions 36 are formed in the edges of the catch, so as to permit of the catch clearing the operating-rod as it is reciprocated by the spring 37, which spring is attached at one end to the disk 20 by means of a slotted pin 37$^a$, held in position by means of set-screws 37'. A catch-pin 38 is fitted across the open end of the catch and is received in and passes through the pinways of the disks (see Figs. 1 and 6) when the catch is fitted to the disk. The spring 37 is adapted to exert a pressure against the catch, tending to depress the latter and retain the catch-pin in contact with the pinway of the inner disk, leaving one-half of its diameter extending over the periphery of the inner disk into the pinway of the outer disk, thereby securely locking the circuit-breaker in closed position. In short, the catch comprises a shoe 34$^a$, normally received in the cut-away portion or peripheral recess 35 in the disk 20. To either side of the shoe are secured arms or standards 34 34, which embrace the inner and outer disks, the arms being cut away intermediate their ends, as at 36, to accomodate the shaft 7. Secured to and extending between the upper ends of the arms 34 34 is the catch-pin 38, received in the pinways, as described. The shoe is beveled at one end at the toe, the heel being squared, as shown, and serving as an abutment to engage the pin 39, the beveled portion being so formed to permit the shoe to ride easily over the pin 39, as will be hereinafter described.

When it is desired to close the circuit-breaker, the operator turns the operating-handle 13, which is securely fastened to the rod 7, until the rounded head of the catch passes over the locking-pin 39, which is fitted in the bracket 40. This presses the pin flush with the face of the bracket, and as the end of the catch clears the locking-pin the latter is released, permitting the flat spring 41 to exert a pressure against the locking-pin, forcing it upward, so as to leave it projecting over the surface of the "bracket" 40 in direct alinement with the travel of the catch. The projecting portion of the locking-pin comes in contact with the heel of the catch and securely locks the circuit-breaker in closed position, counteracting the tension of the springs 42 42. (See Fig. 1.) To the upper portion of the case two flat springs 42 are attached, and the ends are made to press against the swinging bars 24, exerting a continuous pressure against them, and when the catch is released the tension of the springs forces the laminated contacts apart in opposite directions to make a rapid break, leaving a wide gap between the contacts and contact-blocks, as shown in Fig. 2. A boss or enlarged center portion 43 is made integral with the lower portion of the case in direct alinement with the catch when it is locked to retain the contacts in closed position. One end of the boss is screw-threaded and adapted to engage with the threaded end 44 of a suitable support 45, which is provided with an enlarged lower portion 46, forming a support for the solenoid-block 47. The coil 48 is suspended from the bracket, as shown in Fig. 1. A tube 49 is fitted to a suitable aperture in the bracket 47. To the inner periphery of the tube an adjustable core 50 is fitted, which is adapted to be drawn upward in the tube by the solenoid when abnormal conditions exist or the current exceeds a predetermined amount. A plunger or releasing-pin 51 is fitted to an aperture in the boss 43, the end of which pin projects through the support 45 and is adapted to be engaged by the core 50. When the current is abnormal or exceeds a predetermined amount, the core 50 is drawn upward in the tube, and it imparts a blow against the end of the releasing-pin, which in turn impinges against the catch, counteracting the tension of the spring 37 and forcing the catch upward and releasing it from contact with the locking-pin 39.
This forces the catch-pin 38 out of contact with the pinway of the inner disk into the pinway of the outer disk, permitting the outer disk to rotate upon the inner disk, owing to the fact that the pins 22 22, carried by the outer disk, are not quite in alinement with the center of the disk and the opposite pivotal point 25 of the arms 23, by which the pins 22 22 are carried when the catch is locked. Thus the moment the catch-pin 38 is received in the deep groove 33 the strong springs 42 42, against the tension of which the contacts 30 30 are retained against the blocks $a\ b\ c\ f$, are permitted to expand and quickly rotate the outer disk upon the inner disk, the arms 23 23 being forced outward, thereby breaking the circuit. The flat springs 42 pressing against the swinging bars impart motion to the switch mechanism immediately upon the release of the catch, thus insuring a rapid and instantaneous break of the circuit. If it is desired to break the circuit manually, the operating-handle is turned in the opposite direction manually and the inclined or wedge-shaped pinway, which is formed on the periphery of the inner disk, gradually forces the catch-pin into the pinway of the outer disk, releasing the switch mechanism and breaking the circuit while the operating-handle is still in the grasp of the operator.

It will be noted that it is impossible to lock the circuit-breaker while an overload or short circuit exists, as the core of the solenoid is drawn upward, imparting a blow to the releasing-pin, opening the switch the instant it is attempted to close the circuit, notwithstanding the fact that the operating-handle remains in the grasp of the operator.

The last leaf or section 52 of each of the laminated contacts is provided with a heavy piece $52^a$ of brass, secured to the free end in any ordinary way for the purpose of protecting the contacts from the injurious effects of arcing when the contacts leave the blocks. It will be observed that this leaf is designed to leave the contact-block subsequent to the complete break of the laminated contacts from the blocks.

The contact-blocks are designated by reference-letters $a, b, c,$ and $f$ and the extensions of the blocks by reference-letters $d$ and $e$. The stationary contacts or terminal blocks $a, b, c,$ and $f$ are secured to plates 60 60 of insulating material by means of the screws or other fastenings 61, which are countersunk some distance into the insulating-plate to avoid contact with the casing, as shown in Fig. 5, terminal blocks $b$ and $c$ depending from one of the plates 60 and terminal blocks $a$ and $f$ depending from the other of said blocks, the switch-operating mechanism being disposed between the terminal blocks, and the insulating-plates are secured to the roof of the upper portion 1 of the casing by means of the screws 62 62. The circuit is traced as follows: The current is first led to the solenoid or tripping-coil 48 by means of the leading-in wire 63 from the generator-cable (not shown) and from the solenoid to the binding-posts $d'\ e'$ by means of wires or other suitable connections 64 65. The current passes through the binding-posts to the connectors $d\ e$ and thence into the terminal blocks $b$ and $c$, through the laminated swinging contacts 30 30 and arms 27 27, to the opposite laminated contacts 30 30, carried by the arm 27, thence to the terminal blocks $a$ and $f$ and through connectors similar to connectors $d\ e$, but not shown, to binding-posts similar to $d'\ e'$ one of which posts is shown in Fig. 12 at $65^a$, and from thence via the leading-out wires, one of which is shown at 66 in the same figure, to the line-wire. (Not shown.)

It will be observed that a circuit-breaker constructed as heretofore described can be adapted to be used as a single, double, triple, and quadruple circuit-breaker without deviating from the principle herein involved.

What I claim as new, and desire to obtain by Letters Patent, is—

1. In a circuit-breaker, the combination with an operating-shaft, of a plurality of switches movable simultaneously into normal position by the operating-shaft, a loose and a fast disk carried by the shaft, one of the disks connected with the switches, the other of said disks adapted to operate the first-named disk, a single locking device for retaining the switches in normal position, and an electroresponsive device for effecting the simultaneous release of the switches.

2. In a circuit-breaker, the combination with a plurality of switches, of an inner disk, a handle-rod to which the disk is secured, the switches movable simultaneously into normal position by means of the inner disk and handle-rod, and an outer disk connected by means of swinging arms to the movable portions of the switches, an operating-handle, a single locking device for holding said switches in normal position, an electroresponsive device operating the instant the movable contacts are brought into engagement with the terminal blocks, while an overload condition exists in the circuit, and effecting under such circumstances the simultaneous release of said switches independent of any restraining influence on the operating-handle.

3. An automatic circuit-breaker comprising a case adapted to hold an insulating fluid, a plurality of electric switches contained within the case, the switches consisting of movable and stationary contacts, an operating-shaft, a disk secured to the shaft, an annulus loosely mounted on the disk, links connecting the annulus with each of the movable contacts, means for retaining the movable contacts in normal position and an electroresponsive device effecting the release of the movable contacts upon the occurrence of an overload in the circuit.

4. An automatic circuit-breaker comprising a casing, a plurality of switches within the casing, a single operating-shaft controlling the movement of the switches in one direction, means for releasably retaining the switches in normal position and an electroresponsive device for releasing the switches, the electroresponsive device comprising a yoke, a solenoid supported thereby and provided with an aperture, a tube located in the aperture in the solenoid, a collar-pin receivable in an aperture formed in the casing adjacent the switch-retaining means, a core operating in the tube, the core adapted to engage the collar-pin to move the latter into engagement with the switch-retaining means to release the switches.

5. An automatic circuit-breaker comprising a plurality of stationary terminal blocks, swinging laminated contacts adapted to removably engage the terminal blocks, an inner disk, an annular disk rotatably mounted on the inner disk, means connecting the contacts and the annular disk, means for simultaneously drawing the contacts into engagement with the terminal blocks, means for locking the contacts in such position, and an electroresponsive device for effecting the simultaneous release of the contacts, and their operation independently of the inner disk.

6. An automatic circuit-breaker comprising suitably supported and insulated terminal blocks, movable contacts, swinging arms to which the contacts are secured, lugs in which the arms are journaled, tension means constantly engaging the arms to yieldingly retain the contacts away from the blocks, a means freely rotatable in either direction to which the arms are connected, a manually-operated rotatable means, locking means for retaining the two rotatable means together when the contacts are in engagement with the blocks and electroresponsive means adapted to engage the locking means to effect the release of the freely-rotating means irrespective of the operation of the manually-operated means.

7. An automatic circuit-breaker composed of a case consisting of upper and lower portions adapted to hold an insulating fluid, terminal blocks, insulating material, to which the terminal blocks are secured, the insulating material fastened to the upper portion of the case, laminated movable contacts for engaging said terminal blocks, suitably-supported swinging arms to which the movable contacts are attached, flat springs mounted between the swinging arms and adapted to exert pressure against the same to throw the contacts away from the terminal blocks when the switches are unlocked, means for drawing said movable contacts simultaneously into normal position, means for locking said contacts in such position, and an electroresponsive device operating directly on the locking device and effecting the simultaneous release of the movable contacts upon the occurrence of an overload condition in the circuit.

8. In a circuit-breaker, the combination of a plurality of switches adapted to be connected in series on one side of an electrical circuit, means of operating said switches, a single locking device for holding said switches in normal position, an operating-handle having an inner and outer disk fitted thereon and connected to arms carrying contacts through the medium of suitable links, an electroresponsive device operating under overload conditions to effect the release of said switches independent of any restraining influence in the operating-handle.

9. An electric switch composed of a case consisting of an upper and a lower portion, and adapted to hold an insulating fluid, insulating material fastened to the upper part of the case, terminal blocks secured to the insulating material, laminated movable contacts for engaging said terminal blocks, swinging arms by which the movable contacts are carried, flat springs mounted between the swinging arms and adapted to exert pressure against the same to throw the contacts away from the terminal blocks when the switches are unlocked, an operating-handle, means for drawing said movable contacts simultaneously into engagement with said contact-blocks, means for locking or restraining the movable contacts in such position, means for unlocking or effecting the simultaneous release of said movable contacts and permitting their unrestrained movement by turning the controlling-handle in the direction opposite to that taken in closing the switches.

10. An automatic circuit-breaker comprising a suitably-supported rotatable shaft, tension means for normally retaining the shaft at and returning it to one limit of its rotary movement, a disk secured to the shaft, an annular disk rotatably supported on the first disk, suitably-supported swinging arms, links connecting the annular disk and the arms, contact-carrying members secured to and insulated from the arms, contacts carried by the members, terminal blocks adapted to be engaged by the contacts, means for normally forcing the contacts away from the blocks, releasable locking means for retaining the contacts in engagement with the blocks, and an electroresponsive device for actuating the locking device to effect the release of the contacts.

11. In an automatic electric circuit-breaker, a case adapted to inclose the mechanism thereof and retain an insulating liquid, an operating-bar, a handle secured to the projecting end of the bar, an inner disk secured to the operating-bar, an outer disk fitted to rotate on the inner disk, a catch fitted to the sides of the disks, the disks provided with pinways adapted to register with each other, a pin receivable in the pinways and adapted to releasably secure the disks together, means for locking the outer disk against rotation, and means for engaging the locking means and releasing the outer disk.

12. In an automatic electric circuit-breaker, a case, an operating-rod journaled in bearings in the case, one end of the rod projecting outside of the case, a handle secured to the rod, a disk secured to the operating-rod, an outer disk fitted to rotate on the first-named disk, links connected to the outer disk, a catch fitted to said disks, swinging arms, springs adapted to exert a pressure against the swinging arms to break the circuit when the catch is released manually or automatically.

13. A circuit-breaker comprising an operating-shaft, disks mounted thereon, suitably-supported swinging arms, links connecting one of the disks and the swinging arms, carrying members secured to the arms, contacts carried by the members, terminal blocks engaged by the contacts, means tending to force the contacts away from the blocks, a catch carried by one of the disks, a stop against which the catch abuts to retain the contacts in engagement with the blocks, a releasing-pin located adjacent the stop and an electroresponsive device adapted to impinge against the releasing-pin, to cause the latter to release the catch from the stop.

14. In a circuit-breaker, the combination with an operating-shaft, and a plurality of separated terminals, of a plurality of bridge-contacts movable simultaneously into and out of normal position, to connect or disconnect the terminals, a disk secured to the operating-shaft, a second disk loosely mounted on the fast disk, means connecting the loose disk and the movable bridge-contacts, means for releasably locking the two disks together when rotated in one direction only, means tending to move the switches and loose disk in the opposite direction, and an electroresponsive device for releasing the locking means to permit the simultaneous movement of the contacts independent of the operating-shaft, the loose disk rotating freely upon the fast disk when rotated in such opposite direction.

15. A circuit-breaker comprising a casing, an operating-shaft journaled in the casing, one end of the shaft projecting outside the casing, a handle secured to the protruding end of the shaft, a spring secured to the shaft and adapted to return the latter to one limit of its rotary movement, a disk secured to the shaft, an annulus rotatably mounted on the disk, suitably-supported swinging bars, contacts carried by the bars, links connecting the annulus and bars, terminal blocks with which the contacts are adapted to engage to close the circuit and means for automatically breaking the circuit.

16. An automatic circuit-breaker comprising stationary isolated terminals, movable bridge-contacts, a rotatable disk, an annulus loosely mounted on the disk, and located intermediate the bridge-contacts, means secured to the bridge-contacts and to approximately opposite points on the annulus, means for locking the annulus and disk when rotation is given the disk in one direction, and electroresponsive mechanism for releasing the locking means to permit a movement of the annulus irrespective of the disk.

17. A circuit-breaker comprising a suitable casing, stationary terminal blocks located therein, and insulated therefrom, connectors secured to the terminal blocks, binding-posts in contact with the connectors, swinging contacts adapted to engage the terminal blocks, a rotary annulus, means pivotally connecting the swinging contacts and annulus, a disk upon which the annulus is mounted and rotates, a catch located between the annulus and disk, means connected with the disk for causing the operation of the catch, gravity-operated means for locking the annulus when the contacts are in engagement with the terminal blocks and electroresponsive means connected with the binding-posts to release the gravity-operating locking means.

18. A circuit-breaker comprising a plurality of terminal blocks, contacts movable toward and from the blocks, a suitably-supported rotary shaft, a disk fast on the shaft, an outer disk loosely supported on the fast disk, means connecting the contacts and outer disk, a locking means receivable between the disks and adapted to frictionally engage the disks when the shaft is rotated in one direction to cause the rotation of the outer disk, a stop engaged by the locking means to normally prevent the reverse rotation of the disks and means for releasing the engagement of the locking means and the stop.

19. A circuit-breaker comprising terminal blocks, suitably-supported swinging contacts adapted to engage the blocks, a rotatable rod, a disk mounted thereon, an annulus rotatably supported on the disk, means connecting the annulus and swinging contacts, locking means located between the disk and annulus, whereby the rotation of the disk in one direction will carry the annulus with it, means for automatically locking the annulus when the contacts are in engagement with the terminals and an electroresponsive means engaging the locking means and releasing the contacts.

20. In a circuit-breaker, the combination with stationary terminals, and contacts movable toward and from the terminals, of a rotary shaft, a recessed member mounted thereon and rotating therewith, an annular member loosely supported upon the rotary member, a locking means carried by the annular member, means connecting the annular member and the movable contacts, a tension means connected with the shaft to retain the latter at one limit of its rotary movement, the locking means adapted to frictionally engage and connect the members when the shaft is rotated against the strength of the tension means, the locking means partly received in the recessed member when the contacts engage the terminals, means for retaining the locking means in the recessed member, and electroresponsive means adapted to release the locking means.

21. A circuit-breaker comprising a plurality of stationary isolated and insulated terminals, an electroresponsive device in circuit with the terminals, movable contacts adapted to engage and connect the terminals, a suitably-supported rotatable disk, an annulus mounted on the disk and having a movement independent thereof, means for locking the disk and annulus together when the disk is rotated in one direction, the annulus connected with and controlling the movement of the contacts, means for locking the annulus in normal position, and means actuated by the electroresponsive device for automatically releasing the annulus.

22. In a circuit-breaker, the combination with stationary terminals, an electroresponsive device in circuit therewith and movable contacts adapted to connect the terminals and complete the circuit, of a rotating annulus with which the contacts are connected, a second rotatable member on which the annulus is supported, the annulus and rotatable member provided with adjacent grooves, a catch-pin received in the grooves and locking the rotatable member and annulus when the rotatable member is rotated in one direction, locking means for retaining the annulus in normal position, and means actuated by the electroresponsive device to release the locking means and permit the annulus to rotate freely on the rotatable member.

23. The combination in a circuit-breaker with a series of independent stationary terminals, an electroresponsive device in circuit therewith and movable contacts adapted to engage the terminals and close the circuit, of a rotatable means with which the contacts are connected, a sliding member carried by the rotatable means, a movable catch against which the sliding member is adapted to abut, and means actuated by the electroresponsive device adapted to engage and actuate the sliding member to release the rotatable means.

24. In a circuit-breaker, the combination with a plurality of terminals, an electroresponsive device in circuit therewith and movable contacts adapted to engage the terminals and complete the circuit, of a rotatable means with which the contacts are connected, a sliding member carried by the rotatable means and normally extending therebeyond, an abutment with which the sliding member engages to retain the rotatable means in set position, a disk upon which the rotatable means is supported, the disk and rotatable means provided with registering recesses, a pin carried by the sliding member and received in the recesses to lock the disk and rotatable means together and means actuated by the electroresponsive device for simultaneously releasing the disk and rotatable means and the rotatable means and abutment.

25. The combination in a circuit-breaker, with a plurality of terminals, and contacts movable toward and from the terminals, of a rotatable disk, an annulus supported upon and rotating independently of the disk, means connecting the annulus and contacts, means for locking the disk and annulus together, a sliding member carried by the annulus, a foot on the sliding member, the toe of the foot being beveled, a pin over which the foot rides, and behind which it lies to retain the annulus in set position and means for releasing the sliding member.

26. The combination with a series of terminals, and movable contacts, of a rotatable disk having an inclined groove formed in the periphery thereof, an annulus received upon and rotating independently of the disk, the annulus provided with a recess in communication with the groove, means connecting the annulus and contacts, a sliding member carried by the annulus, a foot on the member, a pin carried by the member and received in the groove and recess to lock the disk and annulus together, means engaged by the foot to retain the annulus in set position and means for engaging the foot to simultaneously release the annulus from engagement with the disk and with the foot-retaining means.

27. The combination in a circuit-breaker, with stationary terminals and movable contacts, of a rotatable shaft, a disk secured thereupon, an annulus supported upon and rotating independently of the disk, means connecting the annulus and contacts, the annulus provided with a recess formed in the bore thereof, the disk provided with a peripheral inclined groove in communication with the recess, a sliding member embracing the disk and annulus, the sliding member being cut away to receive the shaft, a pin carried by the sliding member and receivable in the recess and groove, means engaged by the sliding member for retaining the annulus in set position, and means engaging the sliding member for releasing it from the retaining means and permitting it to rotate freely on the disk.

28. The combination with a plurality of terminals and movable contacts engaging the terminals, of a suitably-supported rotatable member connected with the contacts and having a slot formed therein, a sliding member carried by the rotatable member, a foot on the sliding member receivable in the slot in the rotatable member and normally partially protruding therefrom, means engaged by the foot for retaining the rotatable member in set position and means for releasing the sliding member.

29. The combination with a plurality of terminals and contacts movable toward and from the terminals, of a rotatable means connected with the contacts, a sliding member, resilient means connecting the sliding member with the rotatable means, the sliding member normally extending beyond the rotatable means, means for engaging the sliding member to retain the rotatable means in set position and means for releasing the sliding member.

30. The combination with a plurality of terminals and movable contacts adapted to engage the terminals, of a rotatable means connected with the contacts, a sliding member carried by the rotatable means, a spring-pressed pin over which the sliding member rides and by which it is held and means for releasing the sliding member.

31. The combination in a circuit-breaker, with a plurality of terminals, of insulated blocks, to which the terminals are secured, a casing, means securing the insulated blocks to the casing, suitably-supported swinging bars, arms secured to and insulated from the swinging bars, contacts carried by the arms and engaging the terminals, a rotatably-supported member, links pivotally connecting the swinging bars and the rotatable member, means for manually rotating the member in one direction, means for automatically retaining the member at one limit of its movement and means operating to release the rotatable member to permit its free rotation in the opposite direction.

32. The combination in a circuit-breaker, with a plurality of terminals, of a suitably-supported recessed swinging arm, an insulated sleeve received in the recess, a carrying-arm received in the insulated sleeve, means for securing the sleeve to the swinging arm, contacts secured to the carrying-arm, means for drawing the contacts into engagement with the terminals, means for retaining the contacts in such position and means for releasing the contacts.

33. In a circuit-breaker, the combination with stationary terminals, and contacts movable toward and from the terminals, a suitably-journaled shaft, a handle thereon, means carried by the shaft and connected with the contacts for actuating the latter, means automatically tending to force the contacts away from the terminals, and resilient means independent of the automatic means, the resilient means secured to the shaft for returning it to one limit of its movement independently of the movement of the contacts.

34. In a circuit-breaker, the combination with terminals and contacts adapted to removably engage the terminals, of a shaft, a disk secured thereon, a rotatable member connected with the disk, means connecting the rotatable member and the contacts, means for locking the disk and rotatable member together when the shaft is turned in one direction, means for retaining the rotatable member at one limit of its movement, means for automatically releasing the rotatable member and means for limiting the rotary movement of the shaft.

35. The combination in a circuit-breaker with terminals and contacts movable toward and from the terminals, of a suitably-journaled shaft, means mounted on the shaft and connected with the contacts for actuating the latter, means tending to rotate the shaft in one direction, a pin projecting transversely of the shaft, and a projection on one of the journals of the shaft against which the pin impinges to limit the rotary movement of the shaft.

36. An automatic circuit-breaker comprising suitably supported and insulated terminal blocks, suitably-supported contacts movable toward and from the blocks, yielding means constantly tending to force and retain the contacts away from the blocks, a means freely rotatable in either direction with which freely-rotatable means the contacts are connected, a second rotatable means on which the freely-rotatable means is supported, locking means for retaining the two rotatable means together for bringing the contacts into engagement with the terminals and for holding the contacts in such position and electro-responsive means adapted to engage the locking means and release the rotating means from each other irrespective of the operation of the supporting rotary means.

Signed at Mansfield this 14th day of March, 1903.

FRANK O. HARTMAN.

Witnesses:
R. W. HARTMAN,
EDITH CLINE.